United States Patent Office 3,180,150
Patented Apr. 27, 1965

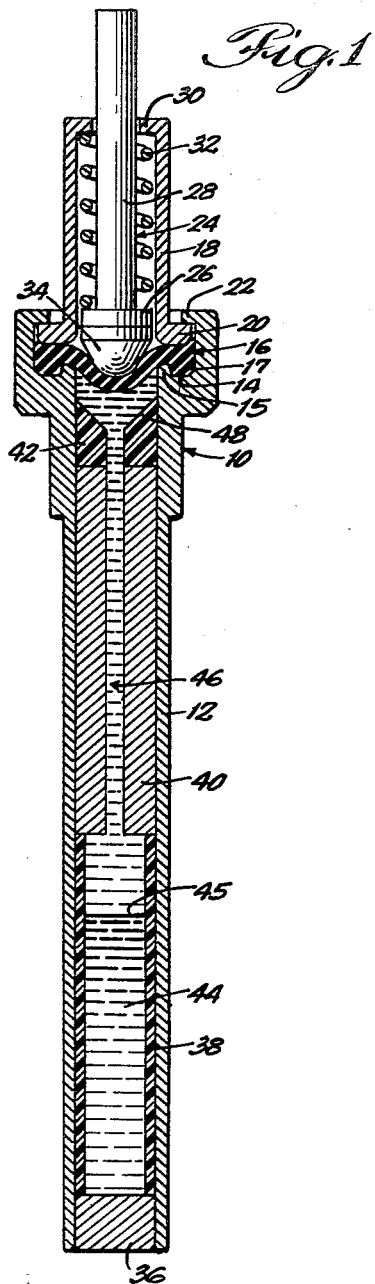
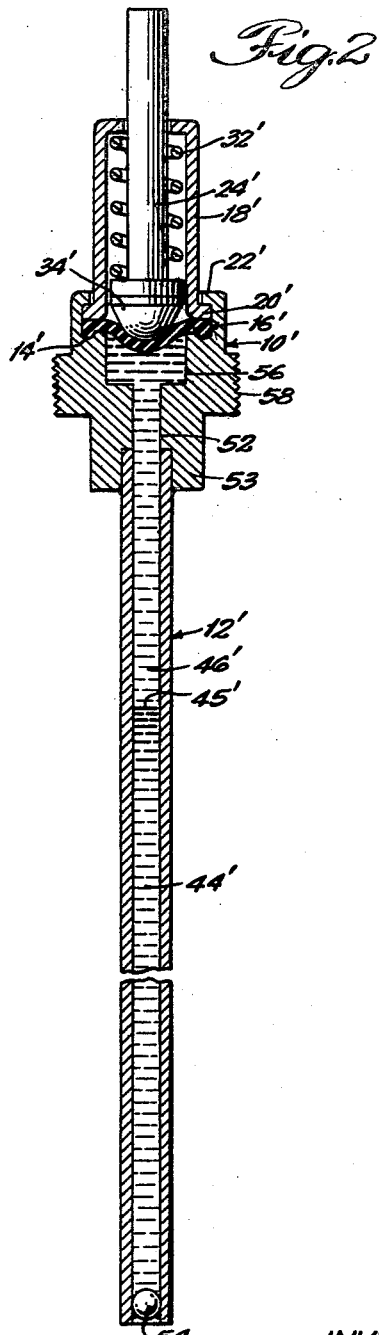

3,180,150
THERMOSTAT
George B. Horne, Ipswich, Mass., assignor to Watts Regulator Company, Lawrence, Mass., a corporation of Massachusetts
Filed Aug. 1, 1960, Ser. No. 46,792
3 Claims. (Cl. 73—368.1)

This invention relates to a thermostat and more particularly to a thermostat for a hot water valve, wherein the thermally responsive element of the thermostat includes media means which are volumetrically variable.

Thermostats of the general type for use with hot water tanks and the like, wherein the temperature responsive media means is volumetrically variable, are well known in the art. In such thermostats, the thermal expansion and contraction of the media means is converted to mechanical work to effect actuation of some member, such as for opening or closing of a valve.

One object of this invention is to provide an improved construction for a thermostat of the type generally noted, wherein a piston and the volumetrically variable media means are disposed on opposite sides of a flexible diaphragm, and wherein means are provided for maintaining the piston in operative engagement with the diaphragm.

In the development of the improved thermostat of this invention, it was discovered that the use of a plurality of volumetrically variable mediums, each having different volumetrically variable characteristics, may be advantageously employed to accomplish desirable mechanical operations with a thermostat.

Thus, still another object of this invention is to provide an improved thermostat wherein the volumetrically variable media means therefor consists of two or more mediums having different thermal expansion characteristics.

An additional object of the invention is to provide means for controlling the volume and disposition or location of the media means in a thermostat, so that the thermostat design is independent of the media means selected.

A more particular object is to provide the foregoing controlling means in the form of an insertable thermostat liner, and which may be adapted to perform additional functions, especially those of resistance to bending forces and thermal insulation.

It has further been discovered in the development of the improved thermostat herein that the use of sleeves or liners having different coefficients of heat transmission or conductivities provides convenient controls for modulating the response of the thermostat relative to the fluctuations of temperature of water in the hot water tank.

Thus, still another object of this invention is to provide a thermostat wherein the temperature-sensing portion thereof is inexpensive to construct, and wherein the simplicity of construction affords means for varying the heat transmission to the temperature-responsive media therein, so as to modulate the response of the thermostat relative to the heat being sensed.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawings, in which:

FIGURE 1 is a vertical axial cross-section view of one form of thermostat embodying the invention disclosed herein; and FIGURE 2 is a vertical axial cross-section view of another thermostat embodying certain of the elemens of the invention disclosed herein.

Referring now to the drawings, there is shown in FIGURE 1 a thermostat body, generally indicated at 10, which is shaped and arranged to provide an elongated reservoir tube 12 of substantially uniform internal dimension or diameter. A recessed seat 14 is located outwardly of an inner peripheral rim 15 in the tube, and is adapted to receive therein an enlarged peripheral portion 17 of a flexible diaphragm 16. An annular or tubular bonnet or cylinder 18 is provided, having an outwardly turned flange 20 adapted to engage the diaphragm 16 to clamp the diaphragm between the flange and the annular recessed portion 14 of the thermostat body 10. The body 10 is provided with a peripheral edge 22 which is adapted to be spun over to clamp the bonnet 18 against the diaphragm 16, and to clamp the diaphragm against the seat 14, so as to effect sealing between the diaphragm and the thermostat body 10.

There is provided a headed plunger, or piston, generally indicated at 24, having a head 26 and a reduced stem 28, and which cooperates with a sleeve, or ring, portion 30 of the bonnet 18 to provide guide means for the movement of the piston 24 relative to the bonnet 18. A coil spring 32 is provided surrounding stem 28 and located between ring 30 and the under side of the head 26, and which normally biases the plunger 24 in the direction toward and against the diaphragm 16. The other side of the head of the plunger 24 is equipped with a nose piece 34 which engages the diaphragm 16 and which is formed of a slightly flexible material, as described subsequently in greater detail.

The lower end of the tube 12 is sealed by means of a plug 36 that may, for convenience, be welded or brazed to tube 12. The tube 12, although being of substantially uniform internal dimension along its length, is provided therein with a thermally insulating tubular sleeve, ring or liner 38. This first tubular insertable sleeve 38 defines an enlarged well or reservoir at the outer end of the tube 12, remote from the diaphragm 16, and it may be constructed and employed as and when desirable and advantageous for altering the rate of heat transmission between the reservoir and the exterior.

A second insertable tubular member, liner or inner tube 40 is mounted intermediate the ends of the tube 12, following the sleeve 38 when used, and the liner 40 is adapted to control the volume and disposition of the media means within the tube 12. The provision of the liner 40 renders the design of the thermostat body 10 independent of the characteristics of the media means selected or required to accomplish the intended function of the thermostat. The liner 40 may be varied in size and configuration to adapt the media means and thermostat design to each other. In the illustrative embodiment, the bore of the liner 40 is smaller than that of the sleeve 38, to cooperate with the design of the tube 12.

The liner 40 preferably performs the additional important function of resisting sharp bending forces which deliberately or accidentally may be applied to the tube 12. The liner holds open the passageway for the media means and thus assures continued thermostat operation. Furthermore, the liner 40 may be adapted to substantially vary the heat transfer rate between the interior and the exterior, in the manner of the above described sleeve 38.

A third insertable thermally insulating tubular sleeve, liner or ring member 42 is mounted adjacent to the diaphragm 16, in this case following the control liner 40. This inner insulating sleeve is adapted for regulating the heat conductivity in the frequently critical area adjoining the diaphragm.

The uniform cylindrical interior of the tube 12 is important for enabling the insertion and removal of any or all of the several tubular inserts 38, 40 and 42, and at any locations. The same thermostat design can be adjusted by these means to provide for a great variety of situations, and for various types and combinations of media means. Solid or liquid media means can be charged in precise quantities, and the thermostat is filled, with but a minimum of air entrapment.

A preferred feature of the invention is that two, or more, expansible mediums are used in the thermostat. However, a single medium may be employed with satisfactory results on occasion, depending upon the intended use and media requirements. The first expansible medium in the preferred embodiment is indicated at 44 and is located within the confines of the first sleeve 38. A second expansible medium 46 is provided between the first expansible medium 44 and the under side of the diaphragm 16. The border between the two media is shown at 45. The amount of expansible medium preferably is such that the bore of liner 40 is at all times filled with the second expansible medium 46. The thermally responsive means completely fills the tube 12 and engages the diaphragm 16 to move the diaphragm and piston 24 back and forth in unison in response to volume fluctuations of the said expansible means.

In the basic design, the expansible medium 44 has a high rate of volumetric change in the desired temperature range, while the expansible medium 46 is of a different nature and may, for example, have a low rate of expansion in the same range. At the same time, it may have a higher or lower rate of expansion in other temperature ranges. As the expansible medium 38 expands, it causes the material 46 to flow through the small bore in the control liner 40, which liner is also known as an inner tube, and the movement causes the diaphragm 16 to displace upwardly, thereby moving the plunger 24 against the bias of the spring 32. Cooling of the expansible media causes the media to contract, and the plunger 24 is restored under the bias of spring 32. The two media 44 and 46 must be non-miscible, so as to preserve the identity and region of location of the two media with respect to each other.

The provision of two or more dissimilar thermally responsive media enables the provision of a variety of performance characteristics. For example, one medium may be selected to undergo a large volume change at a certain temperature range, to cause the piston 24 to move rapidly for a given distance. A second medium may be selected to undergo a large volume change within a higher temperature range, to move the piston 24 to a terminal position. Or either medium may be selected to undergo only a gradual volume change, or only very little change, throughout the operating range.

Materials may be used which vary from the solid state to the liquid state. They may either remain in one state or change their state as the temperature changes. It is very advantageous to provide one material which undergoes a change in state from solid to liquid, as such change in state is accompanied by a large volume change in a small temperature range. In this case, the provision of a second, normally fluid or semi-fluid medium between the solid material and the diaphragm 16 is also very advantageous. The diaphragm functions more smoothly; premature solidification or melting adjacent to the diaphragm may be obviated; abrasion of the diaphragm is prevented and an even flow of the medium is achieved through restricted passages such as the bore of the control liner 40.

As examples of preferred media for thermostatic control of water tanks near the boiling point of water, a normally solid material is selected as the medium 44 which changes to the liquid state and undergoes a large volume change within a temperature range of 180° F. to 210° F., preferably about 195° F. to 210° F. An especially preferred material is alpha-naphthol, having a melting point of 199° F. minimum and 205° F. maximum as commercially pure material. A preferred lower melting material 46 is polyethylene wax, or other natural and synthetic oils, waxes and the like may be employed according to the performance requirements. When using the preferred alpha-naphthol and a suitable lower melting material, the thermostat is substantially inoperative until a temperature of about 199° F. is reached. It reaches its full capacity before the temperature reaches 210° F. Upon cooling, the thermostat returns to its starting position at a minimum temperature of about 195° F.

The body 10 may be constructed of copper or brass, for example. The various sleeves or liners, 38, 40, and 42, may be selected to have different coefficients of transmission of heat, thereby modulating the rate of heating or cooling of the expansible media within the tube 12, and controlling the rate of temperature change of the expansible media in response to the temperature change of the fluid into which the stem 12 of the thermostat is immersed. Different portions of the same medium or of different media may be modulated. In this manner, for example, premature heating or solidification may be prevented, or a succession of effects may be produced. The insulating sleeves 38 and 42 may be constructed of such materials as plastics, fiber, low conductivity metal, and ceramics. A preferred plastic is polytetrafluoroethylene, known as "Teflon." Synthetic rubbers are contemplated, such as silicone rubbers, Viton, and Fluorel. The requirements for the material are ability to form in the desired shape; a minimum heat distortion temperature above the critical temperature, e.g., about 275° F. minimum for the normal boiling point of water; chemical inertness in the environment; and low thermal conductivity. The control liner 40 is preferably constructed of relatively strong material, such as steel, brass or other metal, or plastic, having suitable conductivity.

The nose piece 34 of the plunger is preferably constructed of a solid material such as polytetrafluoroethylene, which material is slightly flexible, so that pressure applied against the end of the nose piece causes it to expand in diameter, thereby filling up the internal bore of the bonnet or cylinder 18 and preventing any extrusion of the flexible diaphragm 16 between the nose piece 34 and the wall of the bonnet 18. Furthermore, the use of Teflon is preferred as the material of which nose piece 34 is formed, since it is a self-lubricating material.

The annular sleeve 42 has a central bore which is of substantially the same dimension as the central bore of the control liner 40. The uppermost edge of the sleeve 42 is conically beveled, as seen at 48, with the said conical surface 48 being spaced from the diaphragm 16. The spaced conical surface provides a zone of communication of the media which corresponds to the contour of the diaphragm 16 adjacent to the surface.

In the device of FIGURE 2, elements corresponding with numbered elements of FIGURE 1 are given the same reference numeral with the addition of a prime mark. In FIGURE 2, the thermostat body 10' is shown as a unitary annular part defining therein a constricted bore 52 and a downwardly extending recessed sleeve 53. The reservoir tube 12' is of uniform internal and external dimension and fits into the recessed sleeve 53. The bore in tube 12' is of substantially the same dimension as the bore 52 in the thermostat body 10'. The reservoir tube 12' is welded or brazed to the thermostat body 10', as shown, and the distal or lowermost end of tube 12' is closed with a ball 54, or the like, which is welded to the inner periphery of tube 12'. As in the device of FIGURE 1, the reservoir tube 12' contains therein two volumetrically variable media means with different coefficients of expansion, including a first expansible medium 44' being alpha-naphthol and a second expansible medium 46' being a polyethylene wax. The border between the two mediums is shown at 45'.

The upper end of bore 52 opens to an enlarged recess 56 formed in the thermostat body 10', and the enlarged recess 56 is bounded at its upper end by a flexible diaphragm 16′, the peripheral edge of which is seated in a groove 14′ formed in the thermostat body 10′. The body 10′ is also provided with an upstanding annular flange which is adapted to be spun over at 22′ to clamp the outwardly extending flange 20′ of a bonnet 18′ against the periphery of the diaphragm 16′ to effect sealing of the thermostat unit. Positioned within the bonnet 18′ is a plunger or piston 24′ carrying a nose piece 34′, and the plunger is normally biased against the diaphragm 16′ by means of a coil spring 32′ which surrounds the stem of the plunger 24′. The upper end of the bonnet 18′ helps to guide movement of the plunger 24′. The thermostat body 10′ may be provided with a screw-threaded portion 58 adapted for connecting the thermostat to a part adapted to receive said thermostat.

In the form of the device shown in FIGURE 2, the body 10′ is preferably formed of commercial bronze; and the reservoir tube 12′ and ball 54 are preferably formed of stainless steel, which material provides some resistance to heat conduction and operates to rather slowly communicate temperature, of a body in which the tube 12′ is inserted, to the media means within said tube 12′. This construction safeguards against rapid temperature changes, as does the insulating construction of FIGURE 1, and prevents non-uniform solidification and melting. Means for lowering the heat transmission rate below that of copper or brass are required when employing extended tubes 12 and 12′ having a length to internal diameter ratio greater than about 5:1. In addition, an insulating sleeve such as the upper member 42 in FIGURE 1 may be inserted in the recess 56 adjacent the diaphragm 16′ in the FIGURE 2 construction, to modify the heat transmission rate in that zone.

The thermostats herein disclosed are particularly useful in hot-water systems where it is the purpose of the piston or plunger 24 to actuate a valve to control water temperature when the temperature of the hot water into which the stem 12 or 12′ is immersed comes dangerously close to the boiling point. It is therefore desirable that the thermostat give top response, and movement of the plunger 24, when the temperature sensed is in the temperature range just below the boiling point of water. As a design criterion, operation of the plunger 24 in a 10 degree Fahrenheit temperature range just below the boiling point of water is desirable. The movement of the plunger 24 may, for example, causes a relief valve to open to remove hot water from the tank and permit cold water to enter and reduce the temperature.

It will be seen form the foregoing that there is provided by this invention an improved thermostat which is extremely versatile and operates reliably in response to temperature changes. The thermostat may employ one or more responsive mediums, and it preferably utilizes a plurality of non-miscible, volumetrically variable mediums having different thermal expansion characteristics for the purpose of obtaining selected thermostat response within a particular temperature range or ranges.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. In a thermostat of the type comprising a movable piston, media means which varies volumetrically in response to temperature thereof, and a flexible diaphragm separating the piston from the media means and transmitting forces between the media means and the piston; the improvement comprising, in combination: means for guiding the movement of said piston under the influence of the diaphragm; a nose-piece of slightly flexible material on said piston in engagement with the diaphragm and adapted to prevent extrusion of said diaphragm between said piston and said guiding means; means biasing the piston against the flexible diaphragm; an elongated tube of uniform internal cross-section along the length of the tube; said media means being located within said elongated tube and including a plurality of volumetrically variable, non-miscible, mediums in contact with each other and of different thermal expansion characteristics; means including the diaphragm for sealing off the media means to prevent leakage loss thereof; and annular liner means positioned in said elongated tube to control the volume and disposition of said media means in said tube and terminating at a position spaced apart from said diaphragm to provide a reservoir containing therein only one of said mediums for all design conditions to which said thermostat is subjected, said latter means including a restricted passage through which said one medium is caused to move under the volumetric variations of said media means.

2. In a thermostat of the type comprising a movable piston, media means which varies volumetrically in response to temperature thereof, and a flexible diaphragm separating the piston from the media means and transmitting forces between the media means and the piston; the improvement comprising, in combination: an elongated tube of uniform internal cross-section along the length of the tube; said media means being located within said elongated tube and including a plurality of volumetrically variable non-miscible mediums in contact with each and of different thermal expansion characteristics; means including the flexible diaphragm for sealing off the media means to prevent leakage loss thereof; and annular liner means positioned in said elongated tube to control the volume and disposition of said media means in said tube and terminating in a position spaced apart from said diaphragm to provide a reservoir containing therein only one of said mediums for all design conditions to which said thermostat is subjected, said latter means including a restricted passage through which said one medium is caused to move under the volumetric variations of said media means.

3. A thermostat as in claim 2, wherein one of said mediums is alpha-naphthol and another medium is a polyethylene wax.

References Cited by the Examiner
UNITED STATES PATENTS

| | | | |
|---|---|---|---|
| 1,398,281 | 11/21 | Rudiger | 200—140 |
| 1,128,274 | 8/38 | Vernet | 73—368.3 |
| 2,265,586 | 12/41 | Vernet | 236 |
| 2,622,923 | 12/52 | Cobb | 73—358 |
| 2,769,597 | 11/56 | Mayo | 73—368.2 |
| 2,835,634 | 5/58 | Vernet | 73—368.3 |

ISAAC LISANN, *Primary Examiner.*

L. R. PRINCE, *Examiner.*